United States Patent [19]

Cade

[11] 3,734,620

[45] May 22, 1973

[54] MULTIPLE BAND ATOMIC ABSORPTION APPARATUS FOR SIMULTANEOUSLY MEASURING DIFFERENT PHYSICAL PARAMETERS OF A MATERIAL

[75] Inventor: Paul E. Cade, Milton, Vt.

[73] Assignee: International Business Machines Corporation, Armonk, N.Y.

[22] Filed: Apr. 1, 1971

[21] Appl. No.: 130,363

[52] U.S. Cl. ........................356/73, 118/7, 250/218, 250/219 TH, 356/43, 356/85, 356/87, 356/204

[51] Int. Cl. ..........................G01n 21/00, B05c 11/00

[58] Field of Search .................................118/4, 9, 7; 250/218, 219 TH, 226; 356/45, 51, 72, 73, 85, 86, 87, 108, 204, 205, 206

[56] References Cited

UNITED STATES PATENTS

| | | | |
|---|---|---|---|
| 3,654,109 | 4/1972 | Hohl et al. | 118/7 |
| 3,413,482 | 11/1968 | Ling | 356/88 |
| 2,960,002 | 11/1960 | Auble et al. | 356/45 |
| 3,347,701 | 10/1967 | Yamagishi et al. | 118/7 |
| 3,586,854 | 6/1971 | Zega | 118/7 |
| 3,590,255 | 6/1971 | Smith, Jr. et al. | 356/88 |
| 2,973,686 | 3/1961 | Dreyfus et al. | 356/108 |
| 3,117,024 | 1/1964 | Ross | 118/9 |
| 3,400,687 | 9/1968 | Lueck | 250/219 TH |

*Primary Examiner*—Ronald L. Wibert
*Assistant Examiner*—V. P. McGraw
*Attorney*—Hanifin and Jancin and Francis J. Thornton

[57] ABSTRACT

An apparatus for measuring certain properties of a material; such as, temperature and density, by monitoring the atomic absorption of two absorbable spectral lines of the material. The apparatus is based on a complete instrumental system composed of an apparatus for producing an atomic vapor; e.g., a sputtering apparatus, an emitter system capable of producing frequencies absorbable by the atomic vapor; e.g., a light source parallel systems of spectral selection, e.g., optical filters, parallel systems for converting optical information into electrical signals; e.g. photo-electric transducers; and, finally a measurement system which displays the electrical signals, from the parallel transducers, in terms of density and temperatuer of the atomic vapor or in terms of the rate of deposition of material on a work piece in the sputtering apparatus.

The apparatus, in conjunction with an emission spectrometer, can also be used to determine the composition of an atomic vapor.

11 Claims, 4 Drawing Figures

INVENTOR
PAUL E. CADE

BY Francis J. Thornton
ATTORNEY

MULTIPLE BAND ATOMIC ABSORPTION APPARATUS FOR SIMULTANEOUSLY MEASURING DIFFERENT PHYSICAL PARAMETERS OF A MATERIAL

BACKGROUND OF THE INVENTION

1. Field of the Invention

This invention relates generally to apparatus and the method for measuring the temperature, momentum energy and densities of the atomic state of a material by monitoring the band width of two spectral lines absorbable by the material.

2. Description of the Prior Art

Atomic absorption spectroscopy has found wide application as an analytical technique. Typically, a sample to be measured thereby is converted into an atomic vapor in a flame, and the measurement of the amount of light absorbed at certain wave lengths by the atomic vapor will give an indication of the sample content. Some work has been done with flameless atomic absorption spectroscopy. An indication of the state of the art in atomic absorption spectroscopy may be obtained from the book "Atomic Absorption Spectrophometry," by Rubeska and Molden, 1969, published by the Chemical Rubber Co.

Additional papers on this subject are "The Application of Atomic Absorption Spectral to Chemical Analysis" by A. Walsh, Spectrochimica Acta, 1955, Volume 7, Pages 108 to 117, Pergamon Press, Ltd., London and "The Analytical Use of Atomic Absorption Spectra" by B.V. L'vov, Spectrochimica Acta, 1961, Volume 17, Pages 761 to 770, Pergamon Press, Ltd.

The prior art discloses an apparatus of measuring instantaneous and long term electron densities and collision frequencies of a plasma by providing a laser having at least two output modes which are split into separate beams. The first beam is directed through the plasma, thereby incurring a phase shift which is a function of the electron density and a signal intensity attenuation which is a function of the collision frequency, the second beam is shunted past the plasma to an arrangement for comparing the first and second beams.

The use of optical measuring equipment using two wave lengths of light to determine the density of air by measuring the phase shift of the light so used has also been taught in the Prior Art.

Textbooks abound that teach one may use optical techniques for measuring either the temperature or the density of gases. See, for example, "Plasma Spectroscopy" by G. Marr, published by Elsevier Publishing Co., N. Y., 1968, or "Temperature, Its Measurement and Control in Science and Industry," Volume 3, published by Reinhold Publishing Corp., N.Y., 1962.

Another (atomic absorption) technique for measuring the rate and composition in vapor deposition processes is disclosed in U.S. application Ser. No. 724,179 now U.S. Pat. No. 3,564,109, and assigned to the same assignee as the present invention, wherein an apparatus is described that has source of radient energy having a selective wave length absorbed by the material sought to be measured, together with means for measuring the total amount of radient energy absorbed at the selected wave length and means for converting this absorption measurement to a rate and/or thickness measurement and also a composition measurement if desired. This apparatus is predicated upon the evaporation of the target material.

However, the sputtering of atoms in a glow discharge or plasma, in fact, involves the direct transfer of momentum from the bombarding atoms to the atoms of the target and the atoms so ejected depend upon both the mass and the energy of the bombarding ions; thus, the energies and the vapor pressure of the sputtered atoms are, in fact, many times higher than can be exhibited by thermally evaporated material. Since the adhesion of the sputtered material deposited on the substrate being coated, is dependent not only on the mass of sputtered atom, but also on its energy, the rate and thickness measurements achieved by the prior art schemes, although highly accurate when used with evaporation systems becomes less than accurate when used with plasma, glow discharge, or ion beam sputtering systems.

SUMMARY OF THE INVENTION

Broadly speaking the present invention teaches a technique and an apparatus for reliably measuring the momentum energy, temperature and density of ionic or atomic material of less than $10^{18}$ atoms per cubic centimeter without physically interrupting the flow of material.

The apparatus can be utilized for determining the deposition rate of material under the intensive conditions encountered in an apparatus employing glow discharges, plasmas, etc., as the medium which ejects material from the target.

Accordingly the present invention may advantageously be used to determine the rate at which material is deposited out of the gaseous or fluid state and the cohesiveness of the material so deposited.

Although the present invention is useful in determining the momentum energy, atomic temperature and density of material having a density of less than $10^{18}$ atoms per cubic centimeter, it is especially useful when the density of the material is less than $10^{12}$ atoms per cubic centimeter.

When used in conjunction with a deposition apparatus, the present invention can, in conjunction with an emission spectrometer, also determine the composition of the material so deposited on either a continuous or a pulsed basis.

The present invention is best realized through the use of an apparatus that comprises a light source capable of emitting at least two wave lengths of light both of which are partially absorbable by the material under investigation, means for analyzing the light after it has passed through the material and resolving it into its respective wave lengths, means for converting these wave lengths into electrical signals, means for amplifying these signals and feeding them to a non-linear amplifier-comparator which converts these signals to a measurement of temperature aand density. One output of this non-linear amplifier-comparator establishes the temperature of the material, and another output establishes the density of the material. With this knowledge one can readily determine the thickness of the material deposited on and coating a work piece. This can be accomplished, for example, either manually, with aids such as previously prepared tables or automatically, by feeding the information to a computer.

These and other features, advantages and objects of the present invention will be more fully appreciated from the following detailed description of a preferred embodiment of the invention taken in conjunction with the accompanying drawings in which:

DESCRIPTION OF THE EMBODIMENT

Refering now to tthe drawings, an apparatus embodying the present invention will be described in detail as to its construction and operation.

Figure 1:
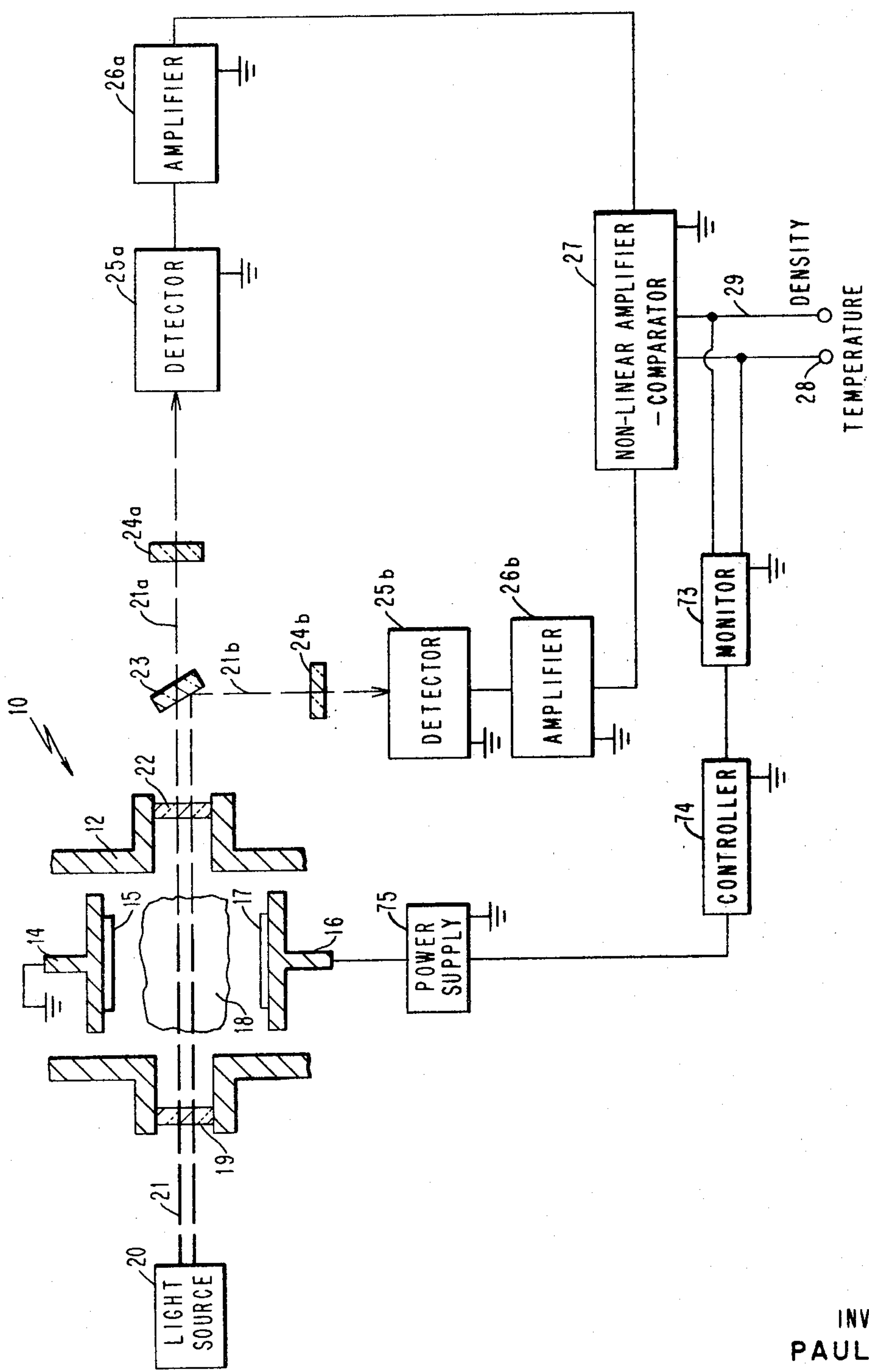
FIG. 1 illustrates in schematic form a complete system employing the present invention.

A sputtering apparatus 10, as shown in FIG. 1, comprises a gas ionization chamber 12 into which a suitable and preferably inert gas, such as, Argon, may be introduced and maintained at a selected pressure by means of pumps (not shown). Within the chamber 12 are positioned a target electrode 14, bearing the material 15 to be sputtered, and a substrate holder 16 which supports the work piece 17 to be coated. Power supply 75 is arranged in accordance with prior art teachings to apply a potential between electrode 14 and the substrate holder 16 to produce an atomic vapor 18 of the target material 15 in the region between the electrode 14 and holder 16 and cause the sputtered material to deposit on work piece 17. RF sputter deposition apparatus and their operation is extensively discussed in the prior art.

On one side of the chamber 12, opposite an optically transparent port 19 composed, for example, of ultraviolet grade fused silica, there is provided a light source 20; such as, a hollow cathode, which will emit a beam 21 having a known intensity and specific wave lengths. This beam of light 21 is directed through the port 19 and through the atomic vapor 18.

It is, of course, necessary that the specific wave lengths contained in the beam 21 be absorbable by the atomic vapor 18.

For purposes of example only, it will be assumed that the material 15 is aluminum. Thus the atomic vapor 18 will also contain aluminum atoms. Preferred wave lengths used with aluminum in this apparatus could, for example, be centered around 3,944 A. and 3,962 A.

It should be clearly understood that these wave lengths are not the only ones that can be used for aluminum; but, were selected because they are strongly absorbable by aluminum. If other materials are to be sputtered, other wave lengths would be used.

Preferred absorption lines for each of the elements are well known and can be readily found in handbooks or the literature. Preferably, one will select lines that, although strongly absorbable by the atomic vapor of interest, will after passing through the atomic vapor still retain some transmission factor; for, if the absorption were 100 percent, no measurement could be made since no light would be available to the measuring equipment. The present apparatus is quite sensitive and can measure the temperature and density of an atomic vapor of sputtered material even though as little as 5 percent absorption of the light occurs.

As the light beam 21 passes through the atomic vapor 18 some of the free atoms in the vapor will selectively absorb a part of the radient energy of beam 21. The amount of absorption is a funciton of the temperature and density of the atomic vapor 18. The atoms that absorb the light energy will be raised to a higher energy state. These excited atoms, of course, ultimately return the absorbed energy into the system as spontaneously emitted radient energy identical to that of the absorbed light. However, this output of the excited atoms is transmitted in all directions; and, in most cases the small fraction of energy observed by the measuring apparatus does not disturb the accuracy of measurement.

However, it is preferred that light source 20 be modulated to pulse beam 21. By using such a pulsed beam extraneous light such as sun light, spontaneous emission from the atomic vapor and other disturbing electro-magnetic radiations; such as, motor noise, etc., may be more easily distinquished from the beam 21 by the measuring apparatus and thus sources of potential error are avoided. In actual practice the beam 21 may be pulsed, for example, by modulating the supply voltage of the light source 20 or by inserting in the beam 21 a mechanical or electromechanical shutter capable of interrupting the beam. Modulating the beam at approximately 287 pulses per second was found to be particularly useful.

This rate of 287 pulses per second is preferred because it offers minimum interference to 60 cps and 400 cps signals which are the most likely sources of extraneous signals in a laboratory or industrial environment. Of course, other modulation rates of greater or lesser values may be used if desired or necessary.

Thus the light absorbed by the atomic vapor can be measured and used to provide pertinent information as is later described.

Sufficiently narrow band width (e.g., ±0.001A.) monochromators that emit the frequency bands of interest can also be advantageously used as source 20. If desired a collimating lens (not shown) can be fixed between source 20 and port 19; however, with a suitable source, such as the above described, hollow cathode source, this lens is generally unnecessary.

On the other side of chamber 12 and directly opposite port 19 and on a line of sight path with source 20 and port 19, is a second port 22, which is identical in all respects to port 19. The distance between the ports 19 & 22 and thus the path length of the radient energy 21 through the atomic vapor is not critical and can range between ½ cm and 100 cm. Preferably the beam 21 is positioned midway between the surface of the work piece 17 and the surface of the material 15.

Adjacent to port 22 and opposite source 20 is an optical beam splitter 23 which divides the transmitted, light beam 21 passing out of port 22 into equal parts indicated in the figure as beams **21*a* and 21*b*. This beam splitter may consist of a prism, half silvered mirror or any of the other known art devices. In the path of each beam 21*a* and 21*b* there is positioned an optical filter; 24*a* for beam 21*a* and 24*b* for beam 21*b***. These filters are selected to block all unwanted frequencies and to pass only the frequency or frequency range of interest.

Figure 3:
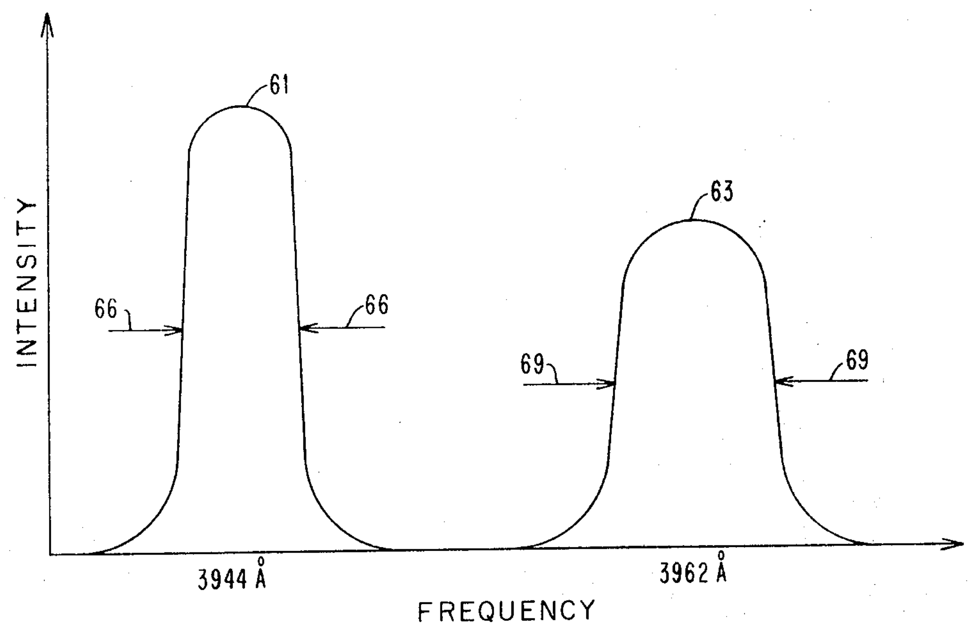
FIG. 3 illustrates two frequency bands of light before they pass through an absorbing medium; and, FIG. 4 illustrates the same frequency bands after they have passed through an absorbing medium.

Assuming aluminum to be the material under study and the selected frequencies to be 3,944 A. and 3,962 A., then the filters **24*a* and 24*b* are selected to accommodate only these frequencies. thus, for example, filter 24*a* is selected to pass only the frequency band centered around 3,944 A. and filter 24*b* is selected to pass only the frequency band centered around 3,962 A. Single pulses of these frequency bands, passed by filters 24***a* and 24*b*, when there is no absorbing atomic vapor in the chamber, are depicted in FIG. 3 as curves 61 and 63.

However, when there is an absorbing atomic vapor in the chamber, these curves become modified by the amount of absorption. This absorption is shown schematically in FIG. 4, where the amount of absorption of curves 61 and 63 is indicated by the shaded areas 64 and 65, respectively. It is to be noted that the shaded areas 64 and 65 are unequal. This disparity indicates that the different frequencies are absorbed differently as they pass through the atomic vapor.

Each pulse of the modulated light beam 21*a* passing filter 24*a;* e.g., curve 61, less shaded area 64, is permitted to impinge on an optical-electrical transducer shown as detector 25*a*. Similarly, each pulse of the modulated light beam 21*b* passing filter 24*b;* e.g., curve 63, less shaded area 65, is permitted to impinge on another optical-electrical transducer shown as detector 25*b*. These transducers, which may, for example, be photo-multiplier detectors, measure the total energy of the light contained in each pulse and convert the received light energy into d.c. electrical signals having the same modulation frequency as the beam 21. Thus transducer 25*a* measures and converts the total energy of the light passed by filter 24*a* and transducer 25*b* measures and converts the total energy of the light passed by filter 24*b*.

The electrical signal so derived from transducer 25*a* is coupled to a synchronous-detector-amplifier 26*a* which demodulates the received signal and thus measures only the modulated signal from source 20 and not any steady state signals or spontaneous emissions of noise. The signal generated by transducer 25*b* is coupled to a second syncronous-detector-amplifier 26*b* which is identical to amplifier 26*a*.

It is to be noted that the curves 61 and 63 of FIG. 3, although having the same general lorentzian shape, are of different widths and intensities. This difference occurs because the intensity of each curve is fixed by the hollow cathode source 20 which emits different frequencies at different intensities. It, therefore, becomes necessary to set the total energy of each pulse, represented by the area under the curves, equal to the other. Equality of this total energy encompassed by each curve is established by adjusting the outputs of the transducers 25*a* and 25*b* to equal each other when no absorbing atomic vapor is contained in the chamber. This causes the width of the lower intensity requency band to widen and thus enclose the same total energy.

Amplifiers 26*a* and 26*b* each should have a band width equal to approximately one-tenth of the rate at which the source was modulated, and low drift and low noise. The units actually selected have a 30 cps band width, a drift of only ±0.5 percent in a sixteen hour period and a noise level of less than 0.1 percent of the voltage output.

The output voltage of the transducer 25*a* and hence the amplified signal from amplifier 26*a* is a measurement of the total energy of the area under the curve 61 less the shaded area 64. This signal is a non-linear function of the temperature of the atomic vapor, the density of the atomic vapor, the temperature of the source 20 and the wave length of light detected by transducer 25*a;* namely, 3,944 A.

The output of transducer 25*b* and hence amplifier 26*b* is similar except here the wave length is 3,962 A.

The amplified demodulated signals from amplifiers 26*a* and 26*b* are now both fed into a non-linear amplifier-comparator 27 which will convert these measurements of total unabsorbed energy into linear measurements of density and temperature. Thus the output 28 of comparator 27 is calibrated to indicate directly the temperature or momentum energy of the material under consideration and the output 29 indicates the density of the material being investigated.

When used as a thickness monitor, the temperature and density measurements received at outputs 28 and 29 can be interpreted to control the rate at which the material is deposited onto the work piece 17 or the total thickness of deposited material. This thickness of deposit, of course, also depends on other parameters such as the temperature of the substrate, the potential voltage existing between the electrodes, the length of time sputtering continues, etc. The consideration of such factors, however, are well within the skill and knowledge to those familiar with the sputtering art and may be set to known levels in a particular sputtering apparatus.

To determine the thickness of the deposited material, in a particular apparatus and under known conditions of time, substrate temperature, etc., the output signals of the non-linear amplifier comparator 27 can be fed into a monitor 73 for converting these outputs into a measurement of thickness.

To control the amount of deposition of material on the work piece 17, the output of monitor 73 can be fed into a controller 74 which is arranged to shut off the sputtering apparatus power supply 75 once a selected thickness has been achieved.

Figure 2:
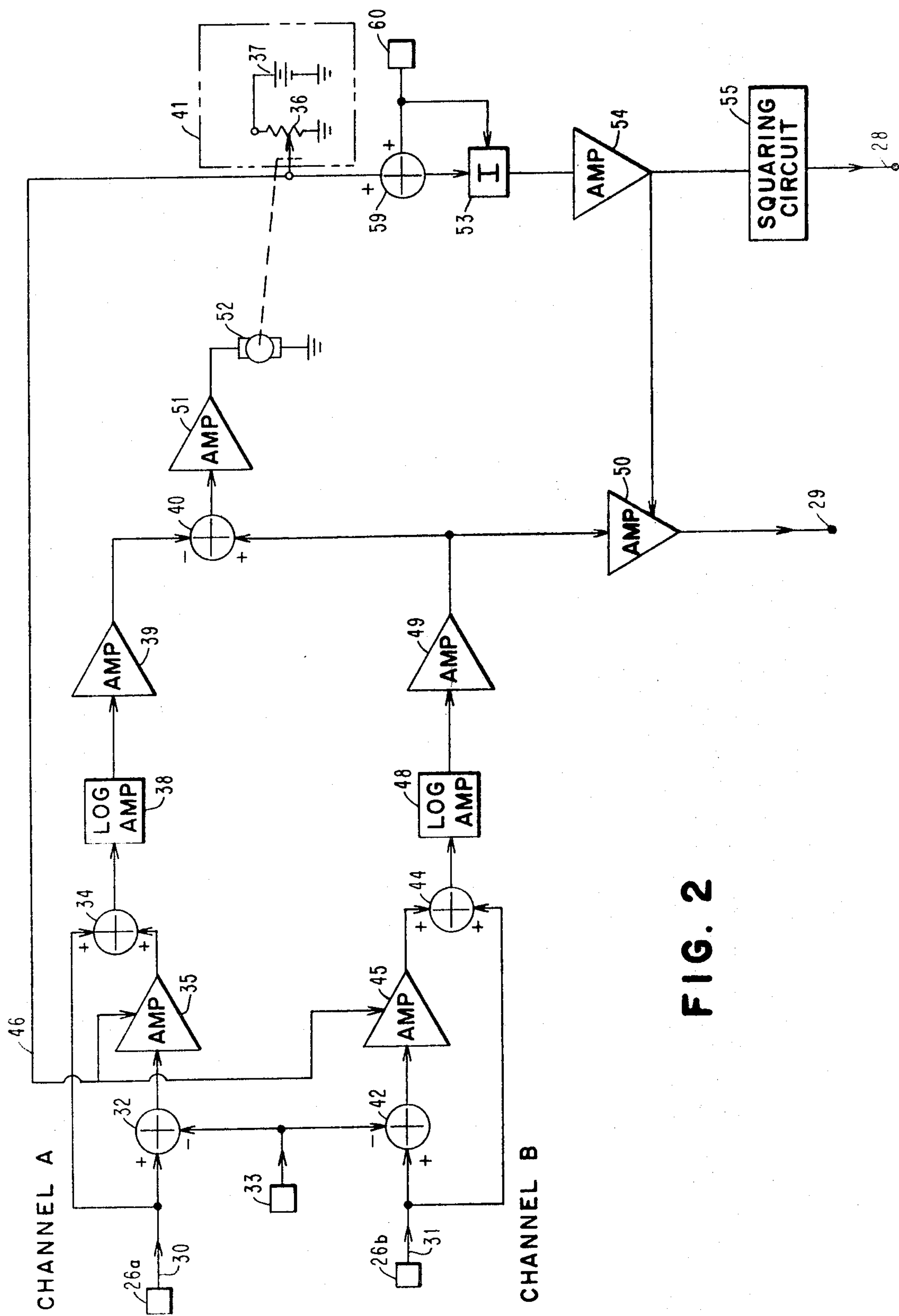
FIG. 2 illustrates in functional block form a non-linear amplifier-comparator suitable for use in the system of FIG. 1.

Turning now to FIG. 2 the non-linear amplifier-comparator 27 of FIG. 1 will be discussed in block functional form. It is to be noted that this apparatus is particularly effective when the temperature of the absorbing medium in chamber 12 is less than or approximately equal to the temperature of the emitter of the hollow cathode. The circuit shown in FIG. 2 has a pair of parallel input channels. For the sake of clarity of description that portion of the circuit analyzing the output of amplifier 26*a* will be referred to as channel A and that portion of the circuit analyzing the output of amplifier 26*b* will be referred to as channel B.

Channel A thus comprises input lead 30, summing circuits 32 and 34 and amplifiers 35, 38 and 39. Channel B comprises input lead 31, summing circuits 42 and 44 and amplifiers 45, 48 and 49.

Input lead 30, of channel A receives from amplifier 26*a* a d.c. voltage which is, as noted above, an electrical measurement of the total unabsorbed light of frequency 3,944 A. passed by filter 24*a*.

To further clarify the understanding of this circuit the various inputs and outputs of each portion of the circuit will be also defined mathematically so that a more complete understanding of the circuit will be available to those skilled in the art.

For the particular situation in hand the output of amplifier 26*a* impressed on lead 30 may be expressed as:

$$K + ( l - K ) e^{-Da\ n l \sqrt{T}}$$

where $K = l - \sqrt{T / TE}$ $T$ is the temperature of the sputtered material, $TE$ is the temperature of the emitting atoms in the hollow cathode light source, $n$ is the atomic density of the sputtered material and $DA = l \lambda a G a / 4 \pi^2 \sqrt{\pi M / 8 Q}$ Where:

$l$ is the path length of the light through the atomic vapor $\lambda a$ is the wave length of the light passing through filter 24*a*;

$Ga$ the tabulated Einstein "A" coefficient for the light passing through filter 24*a*

$M$ the mass of the atom which is sputtered and $Q$ is Boltzman's constant.

The signal imposed on lead 30 is coupled to a pair of summing circuits 32 and 34. In summing circuit 32 a voltage from a 1-volt reference source 33 is subtracted from the signal introduced via lead 30 which was derived from amplifier 26*a*.

This 1 volt signal from source 33 is set to equal the output of transducer 25*a*, if no absorbing vapor were in the chamber; or, in other words is set equal to the total light energy enclosed by curve 61 of FIG. 3.

Figure 4:
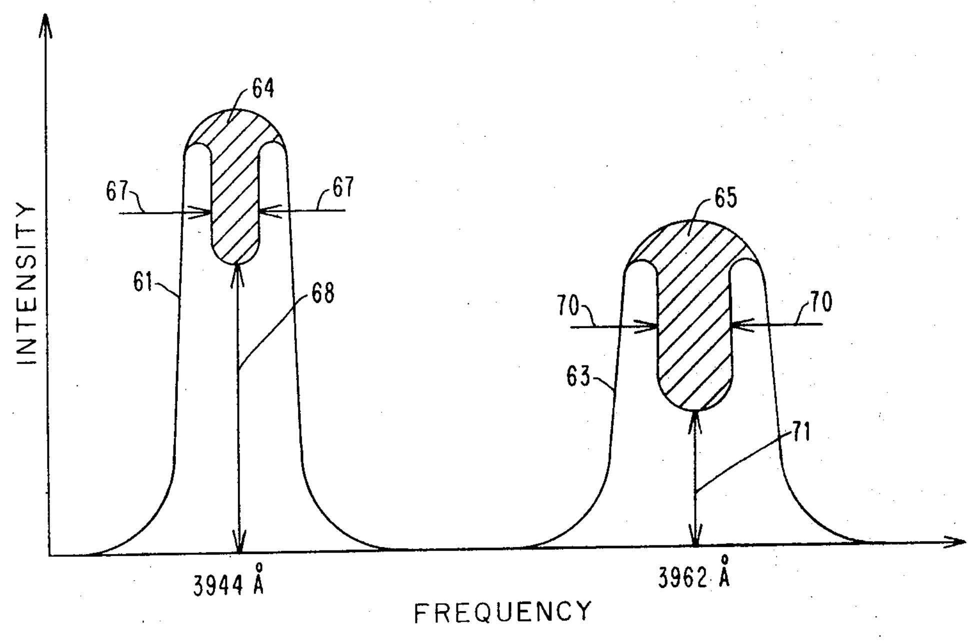

The output of summing circuit 32 is therefore a measurement of the total absorbed light represented by shaded area 64 of FIG. 4 and may be expressed as:

$$( K - l ) ( l - e^{-Da\, n / \sqrt{T}} )$$

This measurement of absorbed light is now fed from summing circuit 32 into an amplifier 35 which has a variable gain that is equal to a ratio of the half-line width of curve 61 indicated by the distance between the arrows 66 of FIG. 3 and the half-line width of absorbed area 64 indicated by the distance between the arrows 67 of FIG. 4. These half line widths are related to the temperature of the absorbing atomic vapor and the temperature of the light source.

This variable gain of amplifier 35 is controlled by a feedback signal derived from lead 46 which is coupled to a variable reference voltage source 41 which derives its output voltage by nulling in a summing circuit 40 the outputs of channels A and B.

Mathematically speaking this feedback voltage and hence the gain of amplifier 35, if channels A and B are nulled, is equal to $$K / ( l - K )$$

and the output of amplifier 35 is $$[K / ( l - K )]( K - l ) (l - e^{-Dan / \sqrt{T}}).$$

which is a measurement of the ratio of the half-line widths of the curve 61 and of the abosrbed area 64; and, the total absorbed light shown by area 64, therefore, is related to the temperature of the absorbing vapor and the temperature of the source.

When this output of amplifier 35 is added to the input signal from lead 30, in summing circuit 34, any effects relating to the temperature of the source are eliminated. Summing circuit 34 thus reduces its input signals to a function proportional to the density and temperature of the atomic vapor and the wave length of light passed by filter 24*a* which is a measurement of the intensity of unabsorbed light in the center of the frequency band (3,944 A.) received by detector 25*a* and is shown in FIG. 4 as the double headed arrow 68. Because this signal is in logarithmic form, it is necessary to pass it through a logarithmic amplifier 38 which will convert it into a non-logarithmic form and pass it to an amplifier 39 having a fixed preset gain. Thus by adding the input signal from lead 30

$$K + ( l - K ) e^{-Da\, n / \sqrt{T}}$$

to the output of amplifier 35

$$[K / ( l - K )]( K - l ) ( l - e^{-Da\, n / \sqrt{T}})$$

in summing circuit 34 there is forwarded to logarithmic amplifier 38 the signal $$e^{-Da\, n / \sqrt{T.}}$$

Logarithmic amplifier 38 now operates on this signal to convert it to its logarithm $$Da\, n / \sqrt{T}$$

and passes it on to amplifier 39.

It will be recalled that $$Da = l \lambda a Ga / 4 \pi^2 \sqrt{\pi M / 8Q}$$

Since the wave length of light $\lambda a$ has been established as 3,944 A., for a known material, in a specific sputtering equipment, this term $Da$ becomes of fixed value. If the gain of amplifier 39 is now set equal, to the reciprocal of this fixed value e.g., $l/Da$ the effects related to the received frequency and expressed by the term $Da$ are removed from the signal.

The output of amplifier 39 therefore becomes $$n / \sqrt{T}$$

which is proportional to the density $n$ of the sputtered atomic vapor and its temperature $T$.

Channel B is substantially identical to Channel A except that it operates on the signal derived from amplifier 26*b* which is related to the frequency 3,962 A. passed by filter 24*b*.

Input lead 31 of channel B receives from amplifier 26*b* a non-linear voltage which is an electrical measurement of the total unabsorbed light of frequency 3,962 A. passed by filter 24*a;* that is $$K + ( l - K ) e^{Db\, n / \sqrt{T}}$$

where $Db = l \lambda bGb/4 \pi^2 \sqrt{\pi M/8Q.}$ $\lambda b$ is the wave length of the light passing through filter 24*b;*

$Gb$ is the tabulated Einstein "A" coefficient of the light passing through filter 24*b*, and the remainder of the symbols are the same as described for A channel above.

This signal is passed to a summing circuit 42 which receives the same voltage from reference source 33 as did summing circuit 32. It should now be recalled that the total energy of the light, received by the detectors 25*a* and expressed by the areas under the curves 61 and 62 were set equal to one another. Thus reference source 33 also equals the output of transducer 25*b* if no absorbing vapor were in the chamber. Thus the output of summing circuit 42

$$( K - l ) ( l - e^{-Db\, n / \sqrt{T}} )$$

is similar to the output of summing circuit 32. This equation, however, contains the term $Db$ which is related to the wave length (3,962 A.) passed by filter 24*b* and represents a measurement of the absorbed light of frequency 3,962 A. indicated in FIG. 4 as shaded area 65.

The output of summing circuit 42 is now passed to an amplifier 45 which also has a variable gain $$K / (l - K)$$

equal to that of amplifier 35 and also derived from feedback lead 46. The output of amplifier 45, therefore, is a measurement of the ratio of the half-line width of the curve 63, indicated by arrows 69 in FIG. 3, and the half-line width of absorbed area 65, indicated by arrows 70 of FIG. 4, and is also related to temperature of the vapor and the source. Mathematically this may be expressed as $$[( K / l - k )]( K - l ) ( l - e^{-Db\ n / \sqrt{T}})$$

When this output of amplifier 45 is fed to a summing circuit 44, identical to circuit 34 of channel A, and added to the input signal $$K + ( l - K ) e^{-Db\ n / \sqrt{T}}$$

from lead 31, the output of summing circuit 44 becomes $$e^{-Db\ n / \sqrt{T}}$$

which is a measurement, in logarithmic form, of the intensity of unabsorbed light in the center of frequency band (3,962 A.) received by detector 25*b* and is shown in FIG. 4 as the double headed arrow 71. When this output signal of circuit 44 is fed to a logarithmic amplifier 48, identical to logarithmic amplifier 38 of channel A, it becomes reduced to $$Db\ n / \sqrt{T}$$

which is the logarithm of the input signal received by amplifier 48.

This output of amplifier 48 is fed to an amplifier 49 having a preset gain. Since the wave length of light $\lambda b$ has been set at 3,962 A., the term *Db* became of fixed value. Thus by setting the gain of amplifier 49 equal to *l*/*Db* the output of the amplifier 49 equals the output of amplifier 39; namely, $$n / \sqrt{T}$$

provided that tthe proper feedback signal has been received by amplifiers 35 and 45 from source 41.

If the proper feedback signal has been fed to amplifiers 45 and 35 from source 41, via feedback lead 46 the outputs of channels A and B cancel one another in summing circuit 40.

Should the outputs of channel A and channel B be different because of an improper feedback from source 41, a voltage is detected at the output of summing circuit 40. By coupling this voltage through an amplifier 51 which drives a motor 52 connected to a potentiometer 36 biased by a fixed voltage source 37, the variable voltage source 41 will either increase or decrease in such a fashion as to drive, through feedback lead 46, the gains of amplifiers 35 and 45, to force the outputs of channel A and channel B to become equal. In essence, this is a servo system.

As noted previously, when discussing the gain of amplifiers 35 and 45, the output voltage of source 41 is proportional to a temperature of the absorbing atomic vapor and the temperature of the light source. Since the temperature of the light source 20 can be easily determined by conventional means, this output voltage of source 41 can be manipulated to determine the temperature of the absorbing atomic vapor.

However, because the voltage supplied by source 41 is derived from the outputs of channels A and B which are in turn forced to be equal to one another by source 41, an unwanted constant has been introduced into the output of source 41 which must now be removed in order to accurately determine the temperature of the atomic vapor.

This removal of the unwanted constant is accomplished by adding, in summing circuit 59, a constant voltage from reference source 60 to the output voltage from source 41.

Because the output of source 41 has been forced to equal $$K / ( l - K ) \text{ and } K \text{ is equal to}$$

$$l - \sqrt{T / TE}$$

the voltage from source 60 must also be set to equal the constant which in this case is equal to one volt. The output of summing circuit 59 thus becomes $$\sqrt{TE / T}$$

To further reduce this to the temperature of the vapor the signal is fed into an inverter 53, an amplifier 54 and a squaring circuit 55.

Inverter 53 is a common divider circuit converted into an inverter circuit by having a one-volt reference fed into it. Since as indicated above reference source 60 is a 1-volt source, the signal from source 60 may be used. The inverter 53 thus causes the signal $$\sqrt{TE / T}$$

to become $$\sqrt{T / TE}$$

The temperature of the source 20 is now measured by any conventional means and the gain of amplifier 54 is set equal to the square root of the temperature of the source. This causes the amplifier 54 to eliminate from its received signal all effects due to the temperature of the source. The output of amplifier 54, therefore, is a measurement of the temperature of the atomic vapor only.

However, because the output of the amplifier 54 is equal to the square root of the temperature, it is necessary to convert this signal into a direct reading of the temperature of the atomic vapor by passing it through the squaring circuit 55 whose output 28 is a direct reading of the temperature of the atomic vapor 18.

Now that the temperature of the atomic vapor 18 has been established, it becomes an easy matter to determine the density of the vapor. It will be recalled that the outputs of channels A and B were in terms of the density of the vapor and its temperature; that is, the outputs of these channels were both equal to $$n / \sqrt{T}$$

To determine the density of the atomic vapor, the output of say amplifier 49 is therefore fed to still another amplifier 50 having a vairable gain supplied by the output of amplifier 54.

Since the output of amplifier 54 is $$\sqrt{T}$$

then setting the gain of amplifier 50 equal to the output of amplifier 54, causes the amplifier 50 to eliminate the temperature term in the signal received by amplifier 50 and its output 29 to be a direct measurement of the density of the atomic vapor.

If, at any time, either the temperature of the atomic vapor or/and its density changes then the amount of absorption of light passing through the vapor also changes. Thus the shaded area 64 and 65 of FIG. 4 also would change.

This change of absorption will be detected by the photo-electric transducers 25*a* and 25*b*. Any such change with output of these transducers is reflected iin the outputs of channels A and B to change the output of summing circuit 40 to other than zero which in turn increases or decreases the output of reference source 41 to adjust through feedback 46 the outputs of channels A and B so that they again null in summing circuit 40.

Any change in the voltage output of source 41 is, of course, as described above, a reflection of the change in temperature in the atomic vapor and may change in the outputs of either channel A or B is a direct result of any change in the density and the temperature.

The described circuit is therefore capable of constantly determining any such changes in density and/or temperature of the atomic vapor and accomplishes this by monitoring any change in the amount of absorption of light in two different absorbable frequency bands of light passed through the vapor.

Once these parameters of the atomic vapor have been determined in the circuit shown in FIG. 2 the thickness of deposited material may be found and/or controlled.

This determination of thickness is accompanied by feeding the output signals of comparator 27 into a monitor 73 as shown in FIG. 1. This monitor 73 may comprise, for example, a series of operational amplifiers whose responses are present to provide, for given conditions in a given system, an output in terms of the thickness of material deposited out of the vapor onto work piece 17. The levels to which these amplifiers should be preset can easily be established for a given apparatus by one skilled in the sputtering art and may be determined either empirically or by calculation.

Alternately, for example, this monitor could comprise a series of integrators coupled to a servo loop which would, in response to variations in temperature of the vapor, select a particular integrator or a range of integrators.

The output of monitor 73 can now be directed into a controller 74 arranged to shut off power supply 75 when a selected thickness of material has been deposited on the work piece 17.

Thus monitor 73 and controller 74 together comprise a feedback loop from comparator 27 to power supply 75 to control the deposition of material out of the atomic vapor.

It is to be noted that the specific circuit and mathematical equations embodied within the functional description of FIG.2 can be varied and/or modified to fit the conditions of the particular sputtering apparatus with which it is to be used; and, such changes and modifications can easily be achieved by one skilled in the art.

Although the invention has been described in conjunction with aluminum, it should now be apparent to one skilled in the art that any material can be analyzed as taught by the present invention and that the frequencies of light to be selected for any particular atomic species is well known and readily attainable by one skilled in the art.

The invention thus teaches that an apparatus may be constructed that will determine the temperature and density from a vapor by measuring the shape of two different absorbed spectral lines.

The invention may also find employment in the analysis of chemical reactions.

By presetting the substrate temperature and knowing the composition, temperature and density of the material sputtered together with other variables, such as time, as may be readily controlled within the sputtering chamber 12 by one skilled in the art, the thickness of the sputtered material deposited upon the work piece 17 can be easily determined and measured continuously during the sputtering operation without removing the work piece from the chamber or otherwise disrupting the deposition process.

While the invention has been particularly shown and described with reference to the preferred embodiment thereof, it will be understood by those skilled in the art that various changes in form and details of the device and the method of making it may be made therein without departing from the spirit and scope of the invention.

What is claimed is:

1. An apparatus for simultaneously measuring different physical parameters of particles in a vapor state comprising means for producing first and second frequency bands of radiant energy, both bands being partially absorbable by each of said particles, means for directing the produced bands through said vapor, means for measuring the total amount of absorption of each band by ssaid particles, and means for converting the measured amount of absorption of said first and second bands into selected physical parameters of the particles.

2. The apparatus of claim 1 additionally comprising means for utilizing the converted measured amounts of absorption to control the state of the particle.

3. An apparatus for controlling the thickness of a material deposited on a substrate from an atomic vapor by monitoring the atomic line-width modulation of first and second absorbable spectral lines of a vapor of the material comprising, means for producing a vapor of the material, a source emitting a beam of light containing at least said two lines, means for directing the beam of light through the vapor, means for detecting the light beam after it has passed through the vapor, means for converting said first and second lines of said detected light beam into first and second electrical signals, means for translating said first and second electrical signals into a third electrical signal indicative of the temperature of the vapor and into a fourth electrical signal indicative of the density of the vapor, and feedback means, coupling said third and fourth signal from said translating means to said vapor producing means, for controlling the amount of material deposited from the vapor onto the substrate.

4. An apparatus for measuring the temperature and density of a material by monitoring the atomic line-width modulation of two absorbable spectral lines of the material comprising, a system containing a known material, a source emitting a beam of light containing at least two wave lengths absorbable by the atoms of the material to be measured, means for passing the beam through the material, means for converting the amount of absorption of each of said two wave lengths into a first and into a second electrical signal, a non-linear amplifier-comparator responsive to said signals coupled to said converting means for operating on said first and second signals to translate said signals into third and fourth signals indicative of the temperature and density of the material.

5. An apparatus for measuring the temperature and density of a material by monitoring the atomic line-width modulation of two absorbable spectral lines of the material comprising, a system containing a known material to be measured, a source of light emitting a beam of modulated light containing at least two wave lengths partially absorbable by the atoms of the material to be measured, means for directing the beam of light through the material, means for resolving the light beam after it has passed through the material into its respective wave lengths, means for analyzing each wave length of the resolved light, means for converting each analyzed wave length into a modulated electrical signal, having the same rate of modulation as tthe light, means for demodulating each electrical signal, and means for amplifyng each demodulated electrical signal and feeding each amplified signal to a non-linear amplifier-comparator, said comparator operating on each of said signals to combine said signals and convert said signals into one output signal which defines the temperature of the material and into another output signal which defines the density of the material.

6. A system for determining temperature and density of a fluid material having first and second light waves absorbable by said material comprising, means for producing said fluid material, means for passing said first and second light wave through said material, means for determining the amount of said first and second light waves absorbed by said material, means for producing first and second electrical signals indicative of said absorbed first and second light waves, and means responsive to said first and second electrical signals for deriving the temperature and density of said fluid material.

7. A system as set forth in claim 6 wherein said first and second electrical signals responsive means include a first electrical channel, responsive to said first signal, having an output, a second channel, responsive to said second signal, having an output, a summing circuit for comparing the outputs of said first and second channels, a reference source coupled to the first channel, the second channel and the summing circuit to equalize the outputs of the channels, means connected to the output of one of the channels to derive a measurement of the density of the material, means connected to the output of the reference source to derive a measurement of the temperature of the material.

8. A system as set forth in claim 7 wherein said first and second channel means each comprises a first summing circuit having an output equal to the amount of absorbed light, a second summing circuit having an output proportional to the density and to the temperature of said fluid material, a logarithmic amplifier means for reducing the output of the second summing circuit to its logarithm, and feedback means from said reference source.

9. A system for determining temperature and density of the gaseous material having first and second absorbable spectral lines comprising sputtering apparatus for producing said gaseous material, means for passing a given amount of radiation having said spectral lines into said gaseous material, means for detecting said first and second spectral lines after passage through said gaseous material and for converting said detected spectral lines into first and second electrical signals, and non-linear amplifier-comparator means coupled to said detecting and converting means for translating said first and second electrical signals into measurements of the temperature and density of said gaseous material.

10. A system as set forth in claim 9 wherein said non-linear amplifier-comparator means comprises a first channel means responsive to said first signal, a second channel means responsive to said second signal, a summing circuit for comparing the outputs of said first channel to said second channel and for controlling the output of a voltage source, said voltage source having an output related to the temperature of the material, feedback means for said voltage source to said first channel and said second channel, means connected to the output of one of said channels to derive the density of the material, and means connected to the voltage source for deriving the temperature of the material.

11. A system as set forth in claim 10 wherein said means connected to said voltage source for deriving the temperature of the material comprises a summing circuit connected to said voltage source, to a reference voltage source and through an inverter and an amplifier to a squaring circuit, said amplifier being coupled to said means connected to the output of the other of said channels and to said squaring circuit, said squaring circuit having an electrical output defining the temperature of the material.

* * * * *